Figure 4:
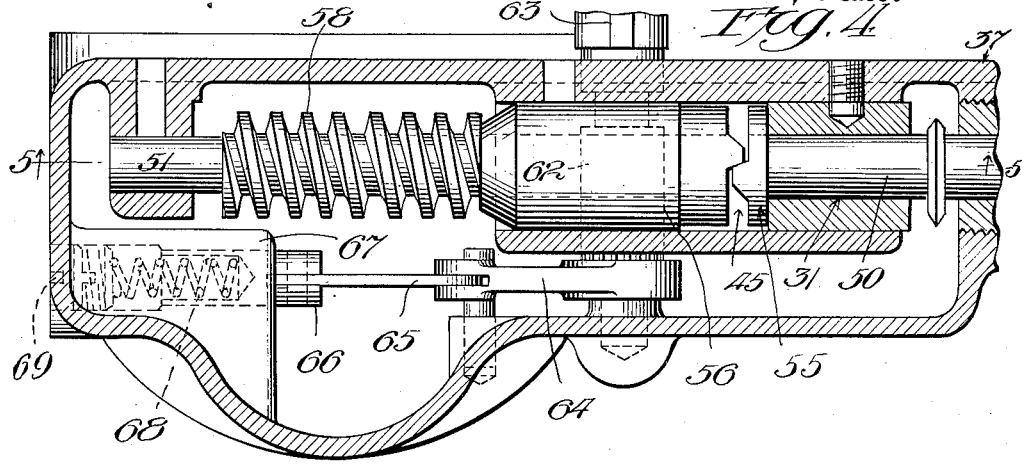

Nov. 23, 1926.　　　　　　　　　　　　　　　　　1,607,628
J. T. HUME
POWER DRIVE FOR LAUNDRY MACHINERY AND THE LIKE
Filed Nov. 2, 1922　　　7 Sheets-Sheet 1
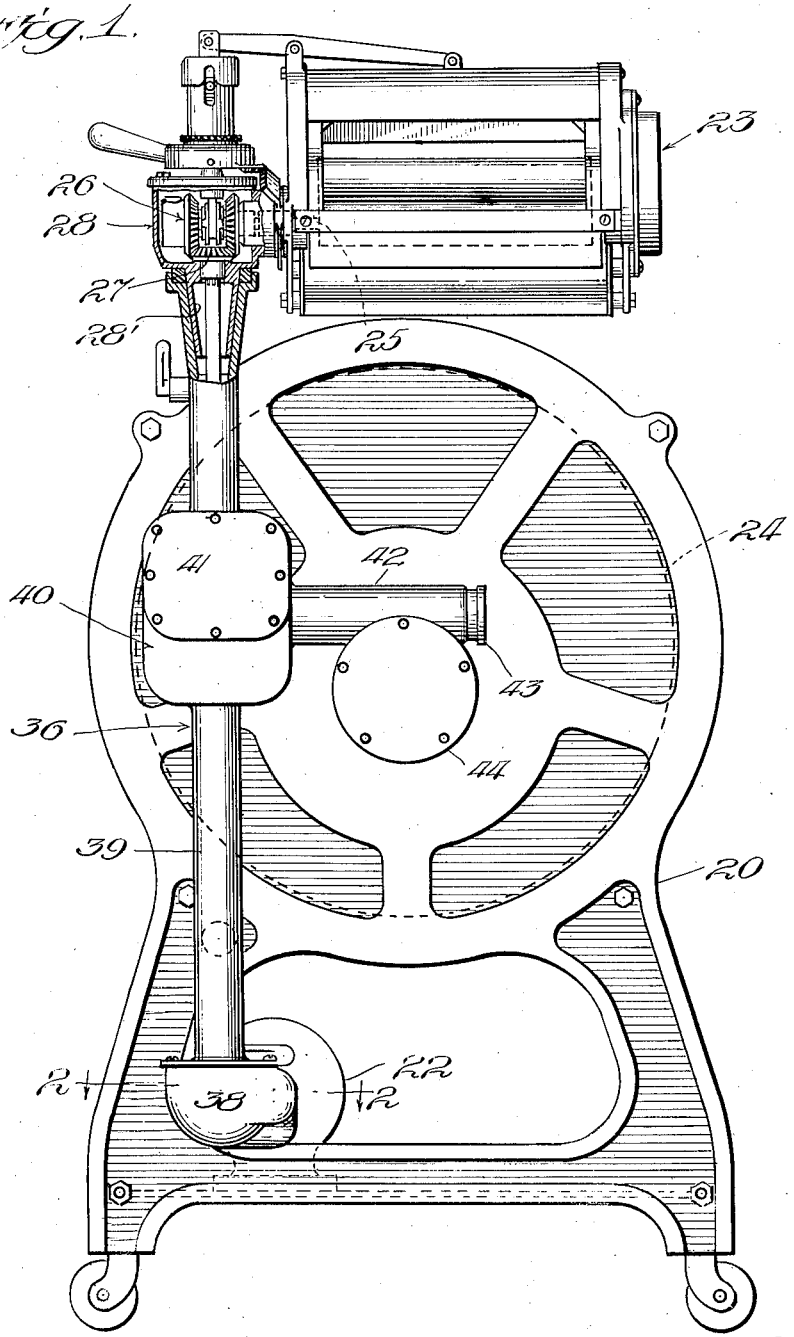
Inventor
John T. Hume

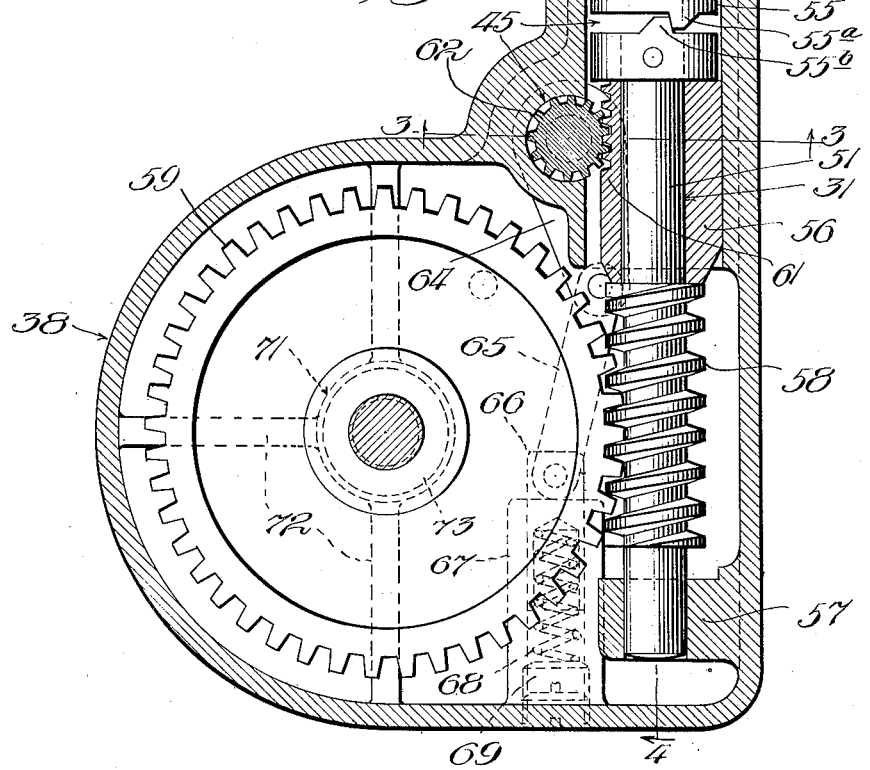

Nov. 23, 1926.

J. T. HUME

POWER DRIVE FOR LAUNDRY MACHINERY AND THE LIKE

Filed Nov. 2, 1922    7 Sheets-Sheet 3

1,607,628

Witness:
Harry S. Gaither

Inventor:
John T. Hume
by Rector Hibben Davis & Macauley
Attys

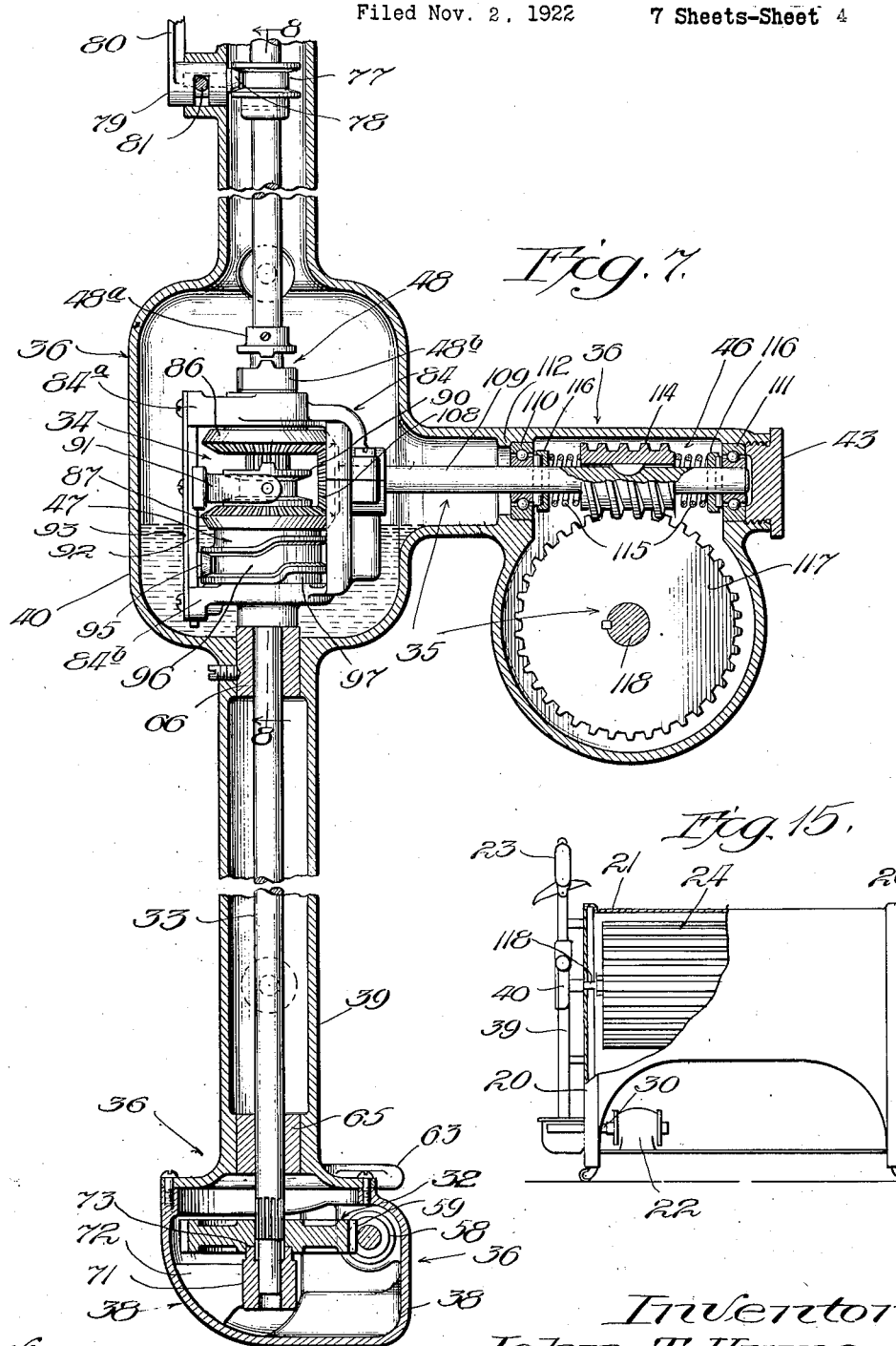

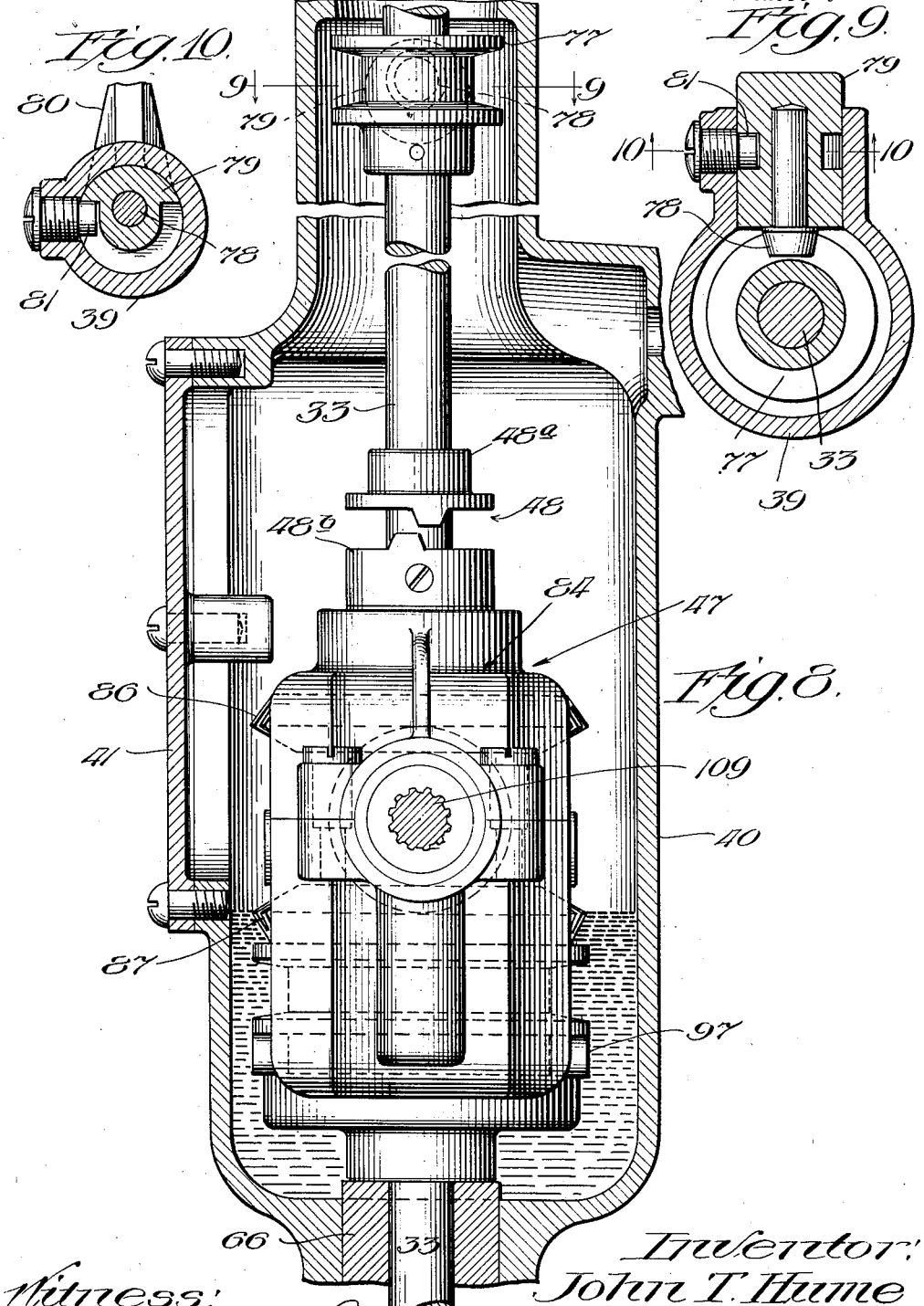

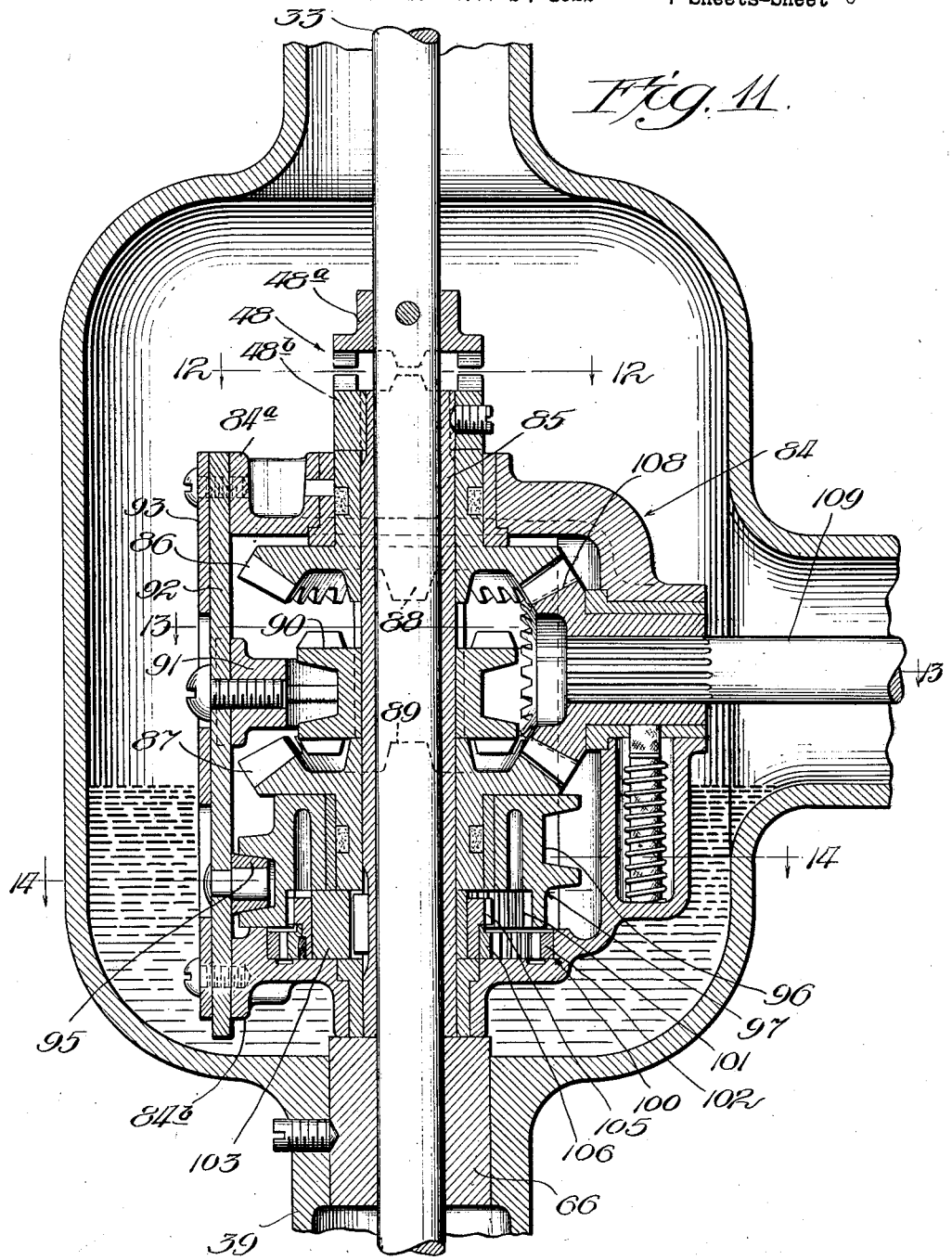

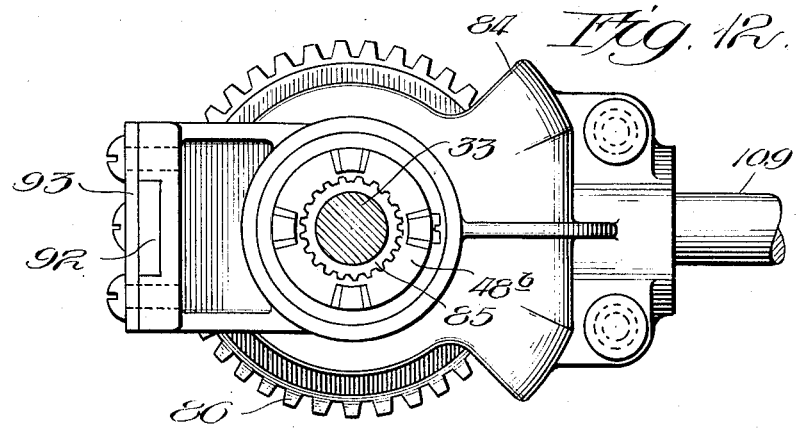
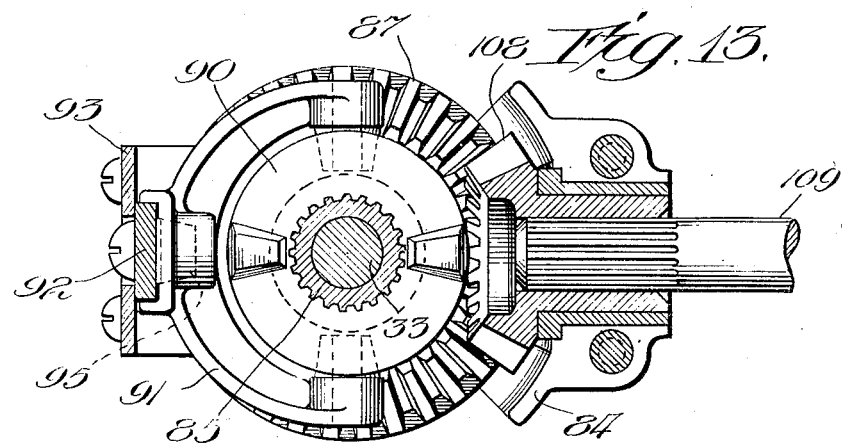
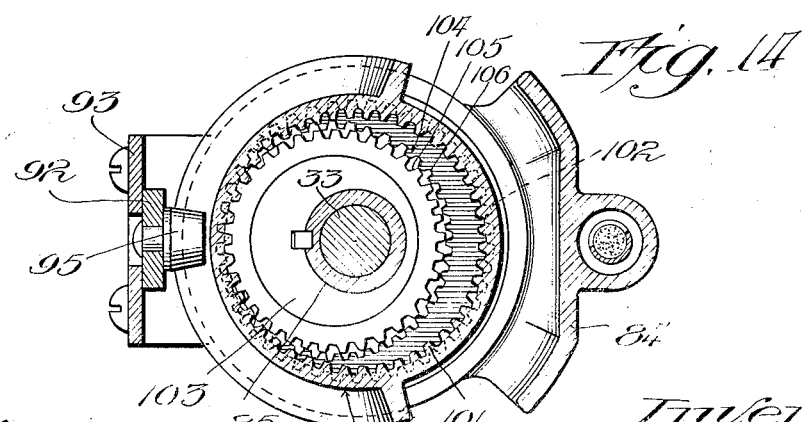

Patented Nov. 23, 1926.

1,607,628

UNITED STATES PATENT OFFICE.

JOHN T. HUME, OF CHICAGO, ILLINOIS, ASSIGNOR TO HURLEY MACHINE COMPANY, A CORPORATION OF ILLINOIS.

POWER DRIVE FOR LAUNDRY MACHINERY AND THE LIKE.

Application filed November 2, 1922. Serial No. 598,515.

My invention relates to power drives for laundry machinery and the like, and in some of its features more particularly to driving mechanism for washing and wringing machines wherein power, supplied by an electric motor, must be delivered from two separate points on a line shaft to operate, respectively, the washing machine cylinder and, at a higher elevation, a clothes wringer.

Among the objects of my invention are to provide such a drive of improved character, and to provide it in a form suitable and advantageous for quantity production in manufacture.

In the mechanism hereinatter set forth, and illustrated in the accompanying drawings, I attain efficiency, durability, safety, ease of operation and maintenance, reliability and economy, all beneficial in the use of the machine; and secure manufacturing advantages in simplicity, low cost, ease of parts production and assembly-facilities, all by virtue of combination of parts and features of construction constituting my invention.

Other and further objects of my invention, such as attainment of great ease of cleaning, repair and renewal of parts, but with only minimum opportunity for deterioration through careless use; advantageous refinements of mechanical structure, and the like, will become apparent from the following description taken in conjunction with the accompanying drawings; but it will be understood that in the drawings I have illustrated, and will specifically describe, only a single embodiment of my invention for purposes of full disclosure but without intent thereby to limit my invention, in its broader aspects, to details of construction as herein shown, except in so far as some detail features may hereinafter be claimed for purposes of their specific advantage.

Figure 5:
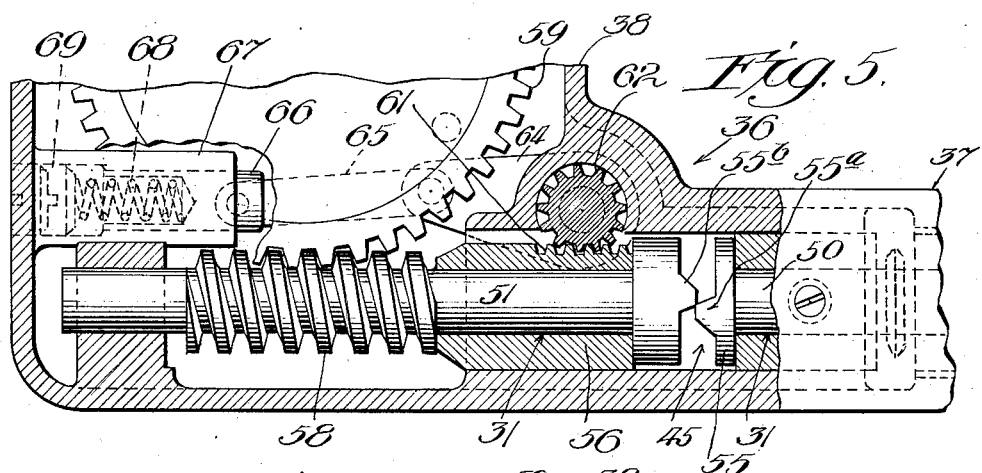
Figure 6:
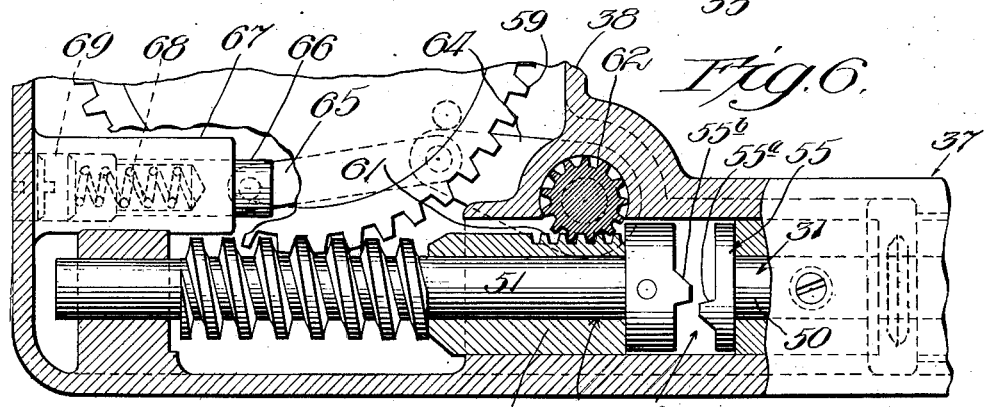

In the drawings Fig. 1 is an end elevation with parts broken away, showing a washing machine and wringer actuated by a drive embodying my invention; Fig. 2 is a horizontal section on line 2—2 of Fig. 1; Fig. 3 is a section on line 3—3 of Fig. 2; Fig. 4 is a section on line 4—4 of Fig. 2; Figs. 5 and 6 are views generally similar to Fig. 4 but showing parts in different positions of operation; Fig. 7 is a detached elevational view of the gearing as in Fig. 1, but with housing-parts in section; Fig. 8 is a section on line 8—8 of Fig. 7; Fig. 9 is a section on line 9—9 of Fig. 8; Fig. 10 is a section on line 10—10 of Fig. 9; Fig. 11 is a central vertical section through Fig. 10; Figs. 12, 13 and 14 are horizontal sections on lines 12—12, 13—13 and 14—14, respectively, of Fig. 11, and Fig. 15 is a reduced front elevation of the machine with parts broken away.

The frames-sides 20 of a suitable shell or casing 21 give platform support to the electric motor or prime mover 22 from which, through my improved drive, the clothes wringer 23 is operated, as is also the movable element of the washing machine, which is preferably a reversely-rotatable cylinder 24 mounted for rotation within the shell 21. As a reversible load-element or element to be driven, this cylinder, adapted as it it to carry a mobile liquid-charged load, makes special demands on its driving train, and in some features my invention advantageously provides for meeting the difficult conditions imposed in the handling of such an element by power supplied from a small, high-speed motor. The practical necessity of driving the pressure-contacting rolls of a clothes-wringer from the same line-shaft that supplies power to the washing machine cylinder, and oftentimes simultaneously with the driving of the cylinder, imposes further particular conditions that are satisfactorily met in the stated drive, but features relating specifically to the wringer construction and its operation from the line shaft I do not claim in this application, said novel features of the particular wringer construction herein shown being the subject of my co-pending application, Serial No. 598,516, filed of even date herewith. Of the wringer, suffice it here to say that the shaft 25 for one of its rolls has connecting gear structure 26 to receive power from the gear 27 on the upper end of a line shaft, the head or gear box 28 containing gear 27 and some of the wringer-controlling parts being also a support for the wringer as a whole and being rotatable to permit the wringer to be swung to different positions about a vertical axis.

30 indicates the motor shaft connectible, through the cooperating parts of a power shaft unit 31, generally horizontally arranged, and by appropriate gearing 32, to an upright line shaft 33 that, at its upper end carries the stated gear 27 for the wringer drive and that, between its ends has provision for connection, interruptible at will, through gearing structure 34 to what I may term as a whole the lateral shaft unit 35 which rotates the cylinder 24. Preferably all of the drive parts are housed, and the housing, generally indicated at 36, is normally rigid with the frame of the machine so that it may give adequate support to various members of the drive. In general this housing comprises a horizontal tubular reach 37 for the power shaft unit, terminating in a gear box 38, a vertical reach or standard 39, the base of which is bolted to and forms a cover for the gear box 38, and its vertical reach 39 receiving at its upper end the stated gear box 28 for the wringer gearing and between its ends having a gear box enlargement 40 for the cylinder-reversing gearing, this being provided with a detachable cover 41 for giving access to and permitting removal of the parts enclosed therein, and said enlargement 40 opening to a lateral reach 42 for the lateral shaft unit, the tubular portion of this reach having a removable end cap or closure 43 and having an enlargement 44 for the reduction-gear element that preferably constitutes a part of the lateral shaft unit.

Among the desiderata sought and attained by my improved drive is the protection of the motor against overload which would burn it out. If too heavy a load is imposed on the main shaft, as by breakage of running parts or clogging of mechanisms driven from the line shaft, the motor should not be stopped, but kept free to run, and this preferably by complete disconnection of the motor from the broken, clogged or overloaded element. Therefore I provide, in the driving train, and preferably in the power shaft unit close to the motor, a torque-responsive positive release mechanism which, when the load on the motor shaft becomes too great, will automatically operate to disconnect the motor completely from its normal mechanical connection with the line shaft and preferably will maintain such disconnection until the device is reset in closed or connecting relation. Such automatic release mechanism I provide in a form generally indicated at 45, Figs. 2 to 6. Further, for its intrinsic advantage and for cooperation with such torque-responsive release mechanism I provide in the lateral-shaft unit or driven shaft unit of the washing machine a yieldable driving connection, generally indicated at 46, with the advantageous driving organization hereafter described by which the container for the mobile fluid load is slowly reversed in direction of rotation, the load-element or cylinder may come to rest, with its load settled to the bottom, and a gradual or yielding take-up not only tends to relieve strain and effect smoothness of operation in general, but particularly relieves momentary increases in requisite motor torque of such suddenness and short duration as might tend to actuate the torque-responsive release mechanism. And further, in the provision of an automatic reversing mechanism for long continued and frequent operation, it is highly desirable to dispense with springs and snap-action in effecting the reversal, to minimize the possibilities of breakage and insure most reliable and steady operation, utilizing the full power of the motor in effecting the reversal of connections; and this related desideratum I attain by novel positive-reverse gearing mechanism which as a whole is indicated at 47 and is contained in the housing gear box 40. Additionally it is highly advantageous, for release of the motor and of gearing parts, that when the operation of the washing machine cylinder is stopped, its reversing gearing shall stand idle in all parts, without wear and without imposing a load on the motor. This I provide for by structure and arrangement effecting such connection, and by a line-shaft clutch 48 between the line shaft 33 and the gearing 34 for driving the cylinder, that the disconnection of said clutch releases the line-shaft from any operative connection whatever with said gearing 34 and allows all of its parts to stand at rest. Specifically, this last stated arrangement may well be accommodated by making the line shaft 33 vertically shiftable by the operator to effect clutch engagement and disengagement, and structure pertinent to this provision is also desirable in an advantageous assembly feature, in that by the construction herein shown, all parts of the power-shaft unit are withdrawable through an end opening of the horizontal reach 37 of the housing; the principal lateral shaft of the unit 35 is withdrawable through the aperture covered by end cap 43 of the lateral reach 42 of the housing; line shaft 33 is vertically withdrawable from the gearing associated therewith, through the upper end of the vertical reach of the housing, and by such provision, facility of subassembly is given that permits the original construction of the machine to be greatly cheapened in labor requirement, and repairs, replacement and inspection greatly facilitates in maintenance.

In the power-shaft unit 31, the motor shaft 30 finds effective continuation in clutch-shaft 50 and, through the clutch of release mechanism 45, it may drive the gear shaft 51. Preferably a universal joint 52 of suitable construction connects shafts 30 and 50 outside of the lower reach 37 of the housing, screw caps 53 closing the end orifice of the housing through which the housing-contained shafting may be withdrawn. A thrust-collar 54 detachably secured in the housing gives bearing to shaft 50 and positions one disk-head of a positive clutch 55, the tooth or teeth 55ª of which may coact with the tooth or teeth 55ᵇ of a similar disk-head on gear shaft 51. The coacting faces of the clutch teeth are slightly beveled so that the driven clutch member may easily escape from the driving clutch member when shaft 51 is moved axially forward. Gear shaft 51 is so mounted as to permit this sliding disengagement of the clutch surfaces. At its rear end it finds bearing in a sliding sleeve 56, and at its forward end it is slidably supported in a bracket 57 cast in the housing. Between these bearings the shaft has a worm 58 to drive (counterclockwise in Fig. 2) the line-shaft worm gear 59, as one specifically desirable provision of a gear-structure 32.

As a desirable means for imposing definite resistance to the torque-responsive opening of the clutch 55, and also giving a snap-action on the opening and a positive maintenance of the clutch in opened condition until it is manually reset, I make the following provision: Rack 61 on the shiftable sleeve 56 engages pinion 62 vertically disposed in bearings in the housing 37, the pinion arbor carrying a handle 63 conveniently located for manual operation. At its lower end the pinion arbor carries a lever 64, horizontally vibratible and connected to a toggle link 65 the opposite end of which is connected to spring block 66 that slides in a chambered bearing stud 67 and is constantly pressed outward by spring 68, the tension of which is adjustable by the movement of bearing screw 69.

The action of this torque-responsive release means is fully shown in Figs. 2, 5 and 6. Normally clutch 55 stands fully engaged. Normally the resistance of toggle spring 68 working through the toggle levers in the "closed" position shown in Fig. 2 suffices to hold the clutch fully closed. When the resistance, or load, opposing movement of worm-gear 59 in its counter-clockwise (Fig. 2) direction of rotation becomes sufficiently high, however, worm 58, carrying sleeve 56, advances axially, rotating pinion 62 against the increasing pressure of the spring until the station shown in Fig. 5 is reached when the toggle passes dead center just before the clutch surfaces lose engagement. Thereupon the spring action becomes effective to augment the opening tendency, and throws the toggle levers to the position shown in Fig. 6, snapping the clutch fully open, and holding it there. Thus, with a very short axial movement, and very compact construction of the parts, I am able to effect, both a very positive clutch engagement for normal operation and a very positive release and maintenance of the clutch in open position under strain conditions that are accurately settable by suitable adjustment of spring-tension.

In the gear-case 38 a step bearing 71 carried on ribs 72 affords a centralizing bearing hub 73 for worm gear 59, and a bottom bearing for the upright line-shaft which makes spline engagement with the gear 59 so that the hub may be withdrawn vertically from the step bearing and the gear. On separation of the gear case 38 from the vertical reach 39, the worm wheel 59 may be lifted out.

The upright line-shaft 33 has centering bearings 65 and 66 in the upright reach of the housing, and at its upper end makes sliding engagement with the horizontally disposed gear 27 of the wringer-drive gearing which is carried in the bottom of gear box 28 which, as a whole, constitutes a removable cover for the upper end of the vertical reach 39 of the housing, the neck 28' making an endwise taper fit into the flaring upper end of the housing member 39. For vertically reciprocating the line-shaft to engage or disengage it with the lateral-shaft gearing 34, a grooved collar 77 is secured on the shaft at a suitable elevation to be engaged by the lifting pin 78 of the crank structure 79, having a handle 80, the crank structure being detachably positioned in its bearing in the housing, and restricted as to range of throw by a removable pin 81. The raising and lowering of the line-shaft by the handle will bring the clutch member 48ª of clutch 48, which is fixed to said shaft out of or into engagement with the cooperating clutch member 48ᵇ which is secured to a sleeve member of the reversing gear structure 34, to throw the washing-machine drive or lateral shaft unit out of or into operation.

Referring particularly to the construction of the positive reversing gear mechanism 47 controlled by the stated clutch 48, its assembly frame 84 is supported on the bearing 66 and positioned against displacement by the vertical line-shaft and the lateral shaft structure. Clutch member 48ᵇ is fast on a sleeve 85 loose on the line-shaft and loosely passing through opposing bevel gears 86 and 87, both having crown clutch formations 88 and 89 to cooperate alternatively with the clutch formations on an intervening clutch member 90 which is splined to the sleeve 85 or° otherwise slidably but non-rotatably mounted thereon. A shifter 91 engaging a groove in the slidable clutch member may throw it into engagement with either one of the gears 86 and 87 to rotate the engaged gear with the sleeve. The shifter arm 91 projects from the vertical slide plate 92 which finds bearing at the extremities of upper and lower arms 84ª and 84ᵇ of the frame-yoke and is retained in its guide by a detachable cover plate 93.

The shifter plate 92 carries a roller 95 for engaging the groove or edge-camway 96 of a horizontally rotatable cam member 97 which is rotatable by the sleeve 85 automatically to control the reversals of the lateral-shaft drive.

Cam 97 is preferably driven from the sleeve through a horizontally disposed, thin, planetary gearing indicated as a whole at 100. The cam 97 supports, in loose rotative relation, the gear wheel 87, and below said gear wheel the cam is interiorly chambered and provided with teeth to form an internal gear 101. In the frame arm 84<sup>b</sup>, below the cam gear is an internal gear-ring 102 fast in the frame arm. Splined on the sleeve 85 is an eccentric 103 interposed between the central portion of the cam and the bearing surface of the frame arm, and carried in rotation by this cam is a double-spur gear 104 having its respective elements 105 and 106 adapted to coact in the respective upper and lower planes with the internal gears 101 and 102 of the cam and the fixed frame. The gear ratios in this planetary gear system may be determined according to the number of rotations of the sleeve desired for effectuation of one rotation of the cam. There being a slight difference as between the two internal-gear couples, it will be apparent that every time the eccentric 103 is rotated by the sleeve 85 its teeth are forced into successive engagement with successive teeth of the stationary internal gear 102, and since, in this same planetation of the spur gears the upper gear 105 must have its teeth successively brought into mesh with the teeth of cam-carried internal gear 101, it follows that the cam must turn in its support to such extent as the difference in ratio of teeth demands. In practice I have provided, with successful results, for one complete revolution of the cam to every fifty-six (56) revolutions of the sleeve, although of course the extent of the reduction may be varied as desired.

It will now be apparent that the cam is kept in constant slow rotation during all of the time that the line-shaft clutch 48 is engaged, and that the cam groove 96 of the form best shown in Fig. 7 will maintain the reversing clutch 90 in engagement with one of the gear wheels 86 and 87 for nearly a half revolution of the cam and then positively force the shiftable clutch member over into engagement with the opposite gear wheel, there being permissible and without injurious effect any dwell or cessation of operation of the lateral shaft unit, while the shiftable clutch member is passing through "neutral" position, that in the construction of the mechanism may be mechanically desirable.

Both bevel gears 86 and 87 constantly engage a beveled pinion 108 supported in a bushed bearing of frame 84, and with this pinion a horizontal shaft 109 makes splined engagement so that it may readily be withdrawn. This shaft is mounted in removable ball-bearings 110 and 111, the races of which bear against the shoulder 112 in the lateral reach of the housing and against the end cap 43, upon removal of which end cap the shaft and its appurtenances may be withdrawn through the end opening of said reach. A worm 114 is rotatable with but slidable along the lateral shaft 109 and is normally spring-positioned in central location by opposite springs 115 interposed between the ends of said worm and the collar 116 which thrusts against the ball-races of the bearings 110 and 111. This worm constantly engages a worm wheel 117 which is fast on the trunnion 118 of the washing machine cylinder. It will be apparent that when the wash-filled cylinder is at rest, in the starting of the machine or during intervals when the reversing clutch is in transit from engagement with one gear of the reversing gearing to the other, the inertia of the load may be overcome without shock on the constantly running line shaft or its appurtenances or its driving motor, because upon the first application of power to the shaft to be driven or lateral shaft 109 it yieldingly communicates power to the load through the yieldable mounting of worm 114.

I claim:

1. In a drive of the character described; a housing having an end opening; a line-shaft in said housing and axially removable therefrom through said end opening; a shaft to be driven, disposed at an angle to the line shaft; gearing, located between the ends of the line shaft and encompassing it and from which the line shaft may axially be withdrawn, such gearing being arranged for operatively connecting said two shafts and being supported and positioned by said housing independently of said line shaft; and bearing means for the line shaft permitting it to be axially withdrawn.

2. In a drive of the character described, a housing having an end opening; a line-shaft in said housing and axially removable therefrom through said end opening; a shaft to be driven from the line shaft and disposed at an angle to it; gearing for transmitting power from the first said shaft to the other, supported and positioned by the housing independently of the line-shaft and encompassing the latter between its ends; bearing means for the line shaft disposed to permit its axial removal; and means for operatively connecting or disconnecting the line shaft and gearing, arranged to permit free axial withdrawal of the line shaft from such gearing.

3. In a drive of the character described, a housing having an end opening; a line-shaft in said housing and axially removable therefrom through said end opening; a shaft to be driven from the line shaft and disposed at an angle to it; gearing for transmitting power from the first said shaft to the other, supported and positioned by the housing independently of the line-shaft and encompassing the latter between its ends; bearing means for the line shaft disposed to permit its axial removal; and axial reciprocation; means on said line shaft to connect it with or disconnect it from the gearing as the shaft is axially reciprocated and arranged to permit free axial withdrawal of said shaft from the gearing; and means for reciprocating the shaft axially.

4. In a drive of the character described, a housing comprising an upright reach having an end opening and a lateral reach having an end opening; gearing supported by said housing at the junction of such reaches; a line shaft passing through such gearing and operatively connectible therewith and freely removable axially from said gearing and housing through the end opening of said upright reach; and a shaft to be driven operatively connectible with a part of said gearing and freely removable axially from connection with said gearing and from the lateral reach of said housing through the end opening of the latter.

5. In a drive of the character described, the combination of a power shaft, an upright line-shaft gear-driven therefrom, a shaft to be driven, extending laterally with respect to the line-shaft, gearing, self-contained in a frame, into which the line-shaft and the shaft to be driven are axially insertable and removable, and when in service make operative connection with the gearing, and a housing member for the drive having provision for supporting said gear frame independently of the line-shaft and shaft to be driven, said housing providing bearing portions for the line-shaft and the shaft to be driven and having end openings through which said shafts may be axially removed.

6. A structure as set forth in claim 5 wherein the housing also provides means for supporting the connecting gears for the power shaft and line-shaft independently of the line-shaft, and has a power-shaft housing reach having an end opening to permit withdrawal of the power-shaft.

7. In a drive of the character described, a housing comprising a lower reach, an upright reach, a lateral reach and a gear casing between the two reaches last mentioned, a power shaft unit in the lower reach, axially removable therefrom; a line-shaft in the upright reach, removable through an end opening thereof; a shaft to be driven in the lateral reach, endwise removable therefrom, and gearing in the housing enlargement, comprising a self-contained unit having parts adapted to be engaged by said line-shaft and shaft to be driven respectively, said housing enlargement having an opening through which said gearing unit may be removed.

8. In a drive of the character described, the combination of a line-shaft, a shaft to be driven, a gearing frame into which said shafts extend, a sleeve in said frame in which the line shaft is rotatable, means for connecting said sleeve with said shaft for rotation, dis-engageable at will; opposed gears loose on said sleeve, shiftable clutch means for engaging either said gear with said sleeve, pinion on the shaft to be driven engaging both said gears and a clutch-shifting mechanism in said frame comprising a cam-grooved wheel coaxial with said line-shaft, a clutch shifter coacting with the shiftable clutch member and the cam, and reduction-gear mechanism carried by said frame and constantly connecting said sleeve and cam slowly to rotate the cam about its axis.

9. Structure as set forth in claim 8, wherein said line-shaft is axially removable from, and reciprocable in, said sleeve and the means for connecting said sleeve and shaft includes a part carried by said shaft and operatable to connect or disconnect said parts by reciprocation of said shaft, combined with means for reciprocating said shaft.

JOHN T. HUME.